US011325096B2

(12) United States Patent
Muldoon et al.

(10) Patent No.: US 11,325,096 B2
(45) Date of Patent: May 10, 2022

(54) MICROWAVE SYNTHESIS OF LITHIUM THIOPHOSPHATE COMPOSITE MATERIALS

(71) Applicant: Toyota Motor Engineering & Manufacturing North America, Inc., Plano, TX (US)

(72) Inventors: John Muldoon, Saline, MI (US); Patrick J. Bonnick, Ann Arbor, MI (US); Koji Suto, Ann Arbor, MI (US); Erika Nagai, Toyota (JP); Keita Niitani, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 170 days.

(21) Appl. No.: 16/043,944

(22) Filed: Jul. 24, 2018

(65) Prior Publication Data
US 2020/0030768 A1 Jan. 30, 2020

(51) Int. Cl.
*B01J 19/12* (2006.01)
*C01D 15/06* (2006.01)
*H01M 10/0525* (2010.01)
*H01M 10/0562* (2010.01)
*H01M 10/0585* (2010.01)

(52) U.S. Cl.
CPC ............ *B01J 19/126* (2013.01); *C01D 15/06* (2013.01); *H01M 10/0525* (2013.01); *H01M 10/0562* (2013.01); *H01M 10/0585* (2013.01); *H01M 2300/0068* (2013.01)

(58) Field of Classification Search
CPC ............ B01J 19/126; H01M 10/0562; H01M 10/0525; H01M 10/0585; H01M 2300/0068; H01M 4/5825; C01D 15/06; C01B 25/14
USPC .......................... 204/157.43, 157.45, 157.5
See application file for complete search history.

(56) References Cited

U.S. PATENT DOCUMENTS

| 8,470,478 | B2 | 6/2013 | Fsujiuchi | |
|---|---|---|---|---|
| 9,401,507 | B2 | 7/2016 | Paolella et al. | |
| 9,809,456 | B2 * | 11/2017 | Miyanaga | ............... B01J 19/126 |
| 2009/0117020 | A1 * | 5/2009 | Manthiram | ............. C01B 25/45 423/274 |
| 2010/0304217 | A1 | 12/2010 | Suzuki et al. | |

(Continued)

FOREIGN PATENT DOCUMENTS

JP WO2013145480 A1 * 10/2013
JP 2014-229490 A 12/2014

OTHER PUBLICATIONS

Berbano et al, "Lithium Thiophosphate Glasses and Glass-Ceramics as Solid Electrolytes: Processing, Microstructure, and Properties," International Journal of Applied Glass Science, 4 [4] 414-425 (2013) DOI: 10.1111/ijag.12037 (Year: 2013).*

(Continued)

*Primary Examiner* — Nicholas A Smith
*Assistant Examiner* — Colleen M Raphael
(74) *Attorney, Agent, or Firm* — Oblon, McClelland, Maier & Neustadt, L.L.P.

(57) ABSTRACT

A microwave induced solvothermal method to prepare lithium thiophosphate composites including $\alpha$-$Li_3PS_4$ and crystalline $Li_7P_3S_{11}$ is provided. The method is scaleable to commercial size production.

7 Claims, 11 Drawing Sheets

(56) References Cited

U.S. PATENT DOCUMENTS

| | | |
|---|---|---|
| 2011/0223359 A1 | 9/2011 | Yang et al. |
| 2013/0040208 A1 | 2/2013 | Kanno et al. |
| 2014/0377664 A1 | 12/2014 | Yersaj et al. |
| 2015/0056515 A1* | 2/2015 | Kim ............... H01M 4/483 204/157.43 |
| 2015/0340737 A1* | 11/2015 | Kako ............... H01M 10/049 429/188 |
| 2016/0181656 A1 | 6/2016 | Sung et al. |
| 2016/0181657 A1 | 6/2016 | Kawaji et al. |
| 2017/0250439 A1* | 8/2017 | Nitta ............... C01B 17/22 |
| 2019/0140275 A1* | 5/2019 | Kim ............... H01M 4/523 |
| 2019/0221851 A1* | 7/2019 | Muldoon ............... H01M 4/134 |

OTHER PUBLICATIONS

Supplemental Information for Berbano et al, "Lithium Thiophosphate Glasses and Glass-Ceramics as Solid Electrolytes: Processing, Microstructure, and Properties" (Year: 2013).*

Han et al, "A Battery Made from a Single Material," Adv. Mater. 2015, 27, 3473-3483 DOI: 10.1002/adma.201500180 (Year: 2015).*

Teragawa et al, "Liquid-phase synthesis of a Li3PS4 solid electrolyte using N-methylformamide for all-solid-state lithium batteries," J. Mater. Chem. A, 2014, 2, 5095 (Year: 2014).*

Trevey et al., "Preparation of Li2S—GeSe2—P2S5 electrolytes by a single step ball milling for all-solid-state lithium secondary batteries," Journal of Power Sources 195 (2010) 4984-4989 (Year: 2010).*

Liu et al, "Anomalous High Ionic Conductivity of Nanoporous β-Li3PS4," J. Am. Chem. Soc. 2013, 135, 975-978 (Year: 2013).*

Supporting material for Liu et al, "Anomalous High Ionic Conductivity of Nanoporous β-Li3PS4," J. Am. Chem. Soc. 2013, 135, 975-978 (Year: 2013).*

Homma, K.; Yonemura, M.; Kobayashi, T.; Nagao, M.; Hirayama, M.; Kanno, R. Crystal Structure and Phase Transitions of the Lithium Ionic Conductor Li3PS4. Solid State Ion. 2011, 182 (1), 53-58.

Yamane, H.; Shibata, M.; Shimane, Y.; Junke, T.; Seino, Y.; Adams, S.; Minami, K.; Hayashi, A.; Tatsumisago, M. Crystal Structure of a Superionic Conductor, Li7P3S11, Solid State Ion. 2007, 178 (15), 1163-1167.

Kanno, R.; Murayama, M. Lithium Ionic Conductor Thio-LISICON: The Li2 S—GeS2—P 2 S 5 System. J. Electrochem. Soc. 2001, 148 (7), A742-A746.

Machida, N.; Yamamoto, H.; Asano, S.; Shigematsu, T. Preparation of Amorphous 75L2S—xP2S3-(25-x)P2S5 (Mol%) Solid Electrolytes by a High-Energy Ball-Milling Process and Their Application for an All-Solid-State Lithium Battery. Solid State Ion. 2005, 176 (5), 473-479.

Teragawa, S.; Aso, K.; Tadanaga, K.; Hayashi, A.; Tatsumisago, M. Preparation ofLi2S—P2S5 Solid Electrolyte from N-Methylformamide Solution and Application for All-Solid-State Lithium Battery. J. Power Sources 2014, 248, 939-942.

Wang, Y.; Lu, D.; Bowden, M.; El Khoury, P. Z.; Han, K. S.; Deng, Z. D.; Xiao, J.; Zhang, J.-G.; Liu, J. Mechanism of Formation of Li7P3S11 Solid Electrolytes through Liquid Phase Synthesis. Chem. Mater. 2018, 30 (3), 990-997.

Ito, S.; Nakakita, M.; Aihara, Y.; Uehara, T.; Machida, N. A Synthesis of Crystalline Li7P3S11 Solid Electrolyte from 1,2-Dimethoxyethane Solvent. J. Power Sources 2014, 271 (Supplement C), 342-345.

Liu, Z.; Fu, W.; Payzant, E. A.; Yu, X.; Wu, Z.; Dudney, N. J.; Kiggans, J.; Hong, K.; Rondinone, A. J.; Liang, C. Anomalous High Ionic Conductivity of Nanoporous β-Li3PS4. J. Am. Chem. Soc. 2013, 135 (3), 975-978.

Extended European Search Report dated Oct. 31, 2019 in Patent Application No. 19188120.0, 11 pages.

Teragawa, S. et al. "Liquid-phase synthesis of a $Li_3PS_4$ solid electrolyte using N-methylformamide for all-solid-state lithium batteries", Journal of Materials Chemistry A, vol. 2, No. 14, XP055633276, 2014, 5 pages.

Phuc, N.H.H. et al. "Preparation of $Li_3PS_4$ solid electrolyte using ethyl acetate as synthetic medium" Solid State Ionics, vol. 288, XP029529074, 2015, 4 pages.

Matsuda, A. et al. "Preparation of $Li_3PS_4$ Solid Electrolyte by Liquid-Phase Shaking Using Organic Solvents with Carbonyl Group as Complex Forming Medium" Journal of the Japan Society of Powder and Powder Metallurgy, vol. 63, No. 11, XP55633361, 2016, 5 pages.

Kamaya, N. et al. "A lithium superionic conductor" Nature Materials, vol. 10, No. 9, 2011, XP055386603, 5 pages.

* cited by examiner

MICROWAVE SYNTHESIS OF LITHIUM THIOPHOSPHATE COMPOSITE MATERIALS

FIELD OF THE DISCLOSURE

This disclosure is directed to a method to prepare Lithium thiophosphate composite materials which is useful as an industrial scale process in terms of product quality, operation time and energy requirement.

BACKGROUND

The ubiquitous Li-ion battery has become an integral part of society, which enabled is the revolution of portable electronic devices, notably cell phones and laptops. The next epoch will be the integration of batteries into the transportation and grid storage industries, further intensifying society's dependence on batteries. State-of-the-art Li-ion cells utilize a liquid electrolyte consisting of lithium hexafluorophosphate salt dissolved in carbonate-based organic solvents. Recently it has become more evident that inorganic solid electrolytes are a superior alternative to liquid electrolytes which are flammable and present environmental issues.

Replacing the flammable organic liquid electrolyte with a solid Li-ion conductive phase would alleviate this safety issue, and may provide additional advantages such as improved mechanical and thermal stability. A primary function of the solid Li-ion conductive phase, usually called solid Li-ion conductor or solid state electrolyte, is to conduct $Li^+$ ions from the anode side to the cathode side during discharge and from the cathode side to the anode side during charge while blocking the direct transport of electrons between electrodes within the battery.

Moreover, lithium batteries constructed with nonaqueous electrolytes are known to form dendritic lithium metal structures projecting from the anode to the cathode over repeated discharge and charge cycles. If and when such a dendrite structure projects to the cathode and shorts the battery energy is rapidly released and may initiate ignition of the organic solvent of the nonaqueous electrolyte.

Therefore, there is much interest and effort focused on the discovery of new solid Li-ion conducting materials which would lead to an all solid state lithium battery. Studies in the past decades have focused mainly on ionically conducting oxides such as for example, LISICON ($Li_{14}ZnGe_4O_{16}$), NASICON($Li_{1.3}Al_{0.3}Ti_{1.7}(PO_4)_3$), perovskite (for example, $La_{0.5}Li_{0.5}TiO_3$), garnet ($Li_7La_3Zr_2O_{12}$), LiPON (for example, $Li_{2.88}PO_{3.73}N_{0.14}$) and sulfides, such as, for example, $Li_3PS_4$, $Li_7P_3S_{11}$ and LGPS ($Li_{10}GeP_2S_{12}$).

Generally, lithium composite sulfides tend to provide better ionic conductivity and malleability. The structural characteristics of effective $Li^+$ conducting crystal lattices have been described by Ceder et al. (Nature Materials, 14, 2015, 1026-1031) in regard to known $Li^+$ ion conductors $Li_{10}GeP_2S_{12}$ and $Li_7P_3S_{11}$, where the sulfur sublattice of both materials was shown to very closely match a bcc lattice structure. Further, $Li^+$ ion hopping across adjacent tetrahedral coordinated $Li^+$ lattice sites was indicated to offer a path of lowest activation energy. However, their utility has been hampered by their known air-sensitivity. Presently, lithium thiophosphates (LTP) are being investigated for use as a non-volatile and thermally stable solid electrolytes in all-solid-state lithium-ion batteries. The most notable examples of lithium thiophosphate solid electrolytes include $Li_3PS_4$, $Li_7P_3S_{11}$ and $Li_{10}GeP_2S_{11}$. Thermally stable solid-state electrolytes allow for a paradigm shift in battery pack design by simplifying thermal management and allowing bipolar stacking, thereby dramatically improving the energy density beyond what would be possible for a Li-ion battery containing liquid electrolyte.

Conventionally, LTP electrolytes are synthesized by mechanochemical milling (i.e. ball milling) or melt quenching. As a synthetic approach, ball milling is tedious and it is debatable whether it can be cost effectively scaled up for bulk-scale synthesis. For example, to create amorphous $Li_3PS_4$ (i.e. a-$Li_3PS_4$), $Li_2S$ and $P_2S_5$ powders are loaded into a stainless steel enclosure filled with stainless steel balls and shaken or rotated for 3 days before sieving the product and cleaning the steel enclosure and balls. This method can also produce large, non-uniform particle sizes, requiring subsequent pulverization to obtain the desired particle size distribution. From a manufacturing point of view, scaling-up this technology would be labor and energy intensive. Solution synthesis of LTP is an alternative that offers numerous potential advantages, but it typically takes 1-3 days, which saves no time in comparison with mechanochemical Conventionally, a-$Li_3PS_4$ is synthesized by mechanochemical milling a 3:1 molar ratio of $Li_2S$ and $P_2S_5$ powders for 72 hours. The amorphous phase is desirable over the crystalline phases ($\alpha$, $\beta$, $\gamma$) due to its enhanced conductivity. For example, at 25° C. a-$Li_3PS_4$ has a conductivity of about 0.1 mS/cm while crystalline $\beta$-$Li_3PS_4$ has a conductivity of about 0.001 mS/cm.

Accordingly, an object of this application is to provide a method to prepare a range of lithium thiophosphate composite materials which is suitable for product provision on an industrial scale.

Another object is to provide a method for the production of amorphous $Li_3PS_4$.

Another object is to provide a method for the production of $Li_7P_3S_{11}$.

SUMMARY OF THE EMBODIMENTS

These and other objects are provided by the embodiments of the present application, the first embodiment of which includes A method to prepare a target lithium thiophosphate composite, comprising: preparing an anhydrous mixture comprising: $Li_2S$; $P_2S_5$; optionally a component B; and a nonaqueous polar solvent; protecting the anhydrous mixture from air and humidity; mixing the anhydrous mixture to at least partially dissolve the $Li_2S$, $P_2S_5$ and component B if present; applying microwave energy to the protected anhydrous mixture to raise the reaction temperature to an optimum value for synthesis of the target lithium thiophosphate composite to obtain the target lithium thiophosphate composite; and removing the polar solvent from the obtained lithium thiophosphate composite; wherein a molar ratio of $Li_2S$ to $P_2S_5$ and to B, if present, is determined by the composition of the target lithium thiophosphate composite.

In an aspect of the first embodiment, when the component B is present the component B is at least one compound selected from the group consisting of $Li_3N$, $P_2O_5$ $Li_2O$, $LiN_3$, $GeS_2$ or LiX wherein X is I, Cl or Br.

In another aspect of the first embodiment, the nonaqueous polar solvent is selected from the group consisting of ethers, nitriles, alcohols, carbonates and esters, with the proviso that the polar solvent is volatile under reduced pressure at a temperature less than a phase transition temperature of the target lithium thiophosphate composite.

In a special aspect of the first embodiment, the target lithium thiophosphate composite is amorphous $Li_3PS_4$, a ratio of Li$_2$S/P$_2$S$_5$ is approximately 3/1, the solvent is tetrahydrofuran and no B component is present.

In another special aspect of the first embodiment, the target lithiumthiophosphate composite is Li$_7$P$_3$S$_{11}$, a ratio of Li$_2$S/P$_2$S$_5$ is approximately 1.05/0.45, the solvent is acetonitrile and no B component is present.

In a more general aspect of the first embodiment the target lithium thiophosphate composite is xLi$_2$S·P$_2$S$_5$·(100-x-y)B, a ratio of Li$_2$S/P$_2$S$_5$ is approximately x/y, and a B component is present in an amount of 100-x-y.

The foregoing paragraphs have been provided by way of general introduction, and are not intended to limit the scope of the following claims. The described embodiments, together with further advantages, will be best understood by reference to the following detailed description taken in conjunction with the accompanying drawings.

DESCRIPTION OF THE PREFERRED EMBODIMENTS

Figure 1:
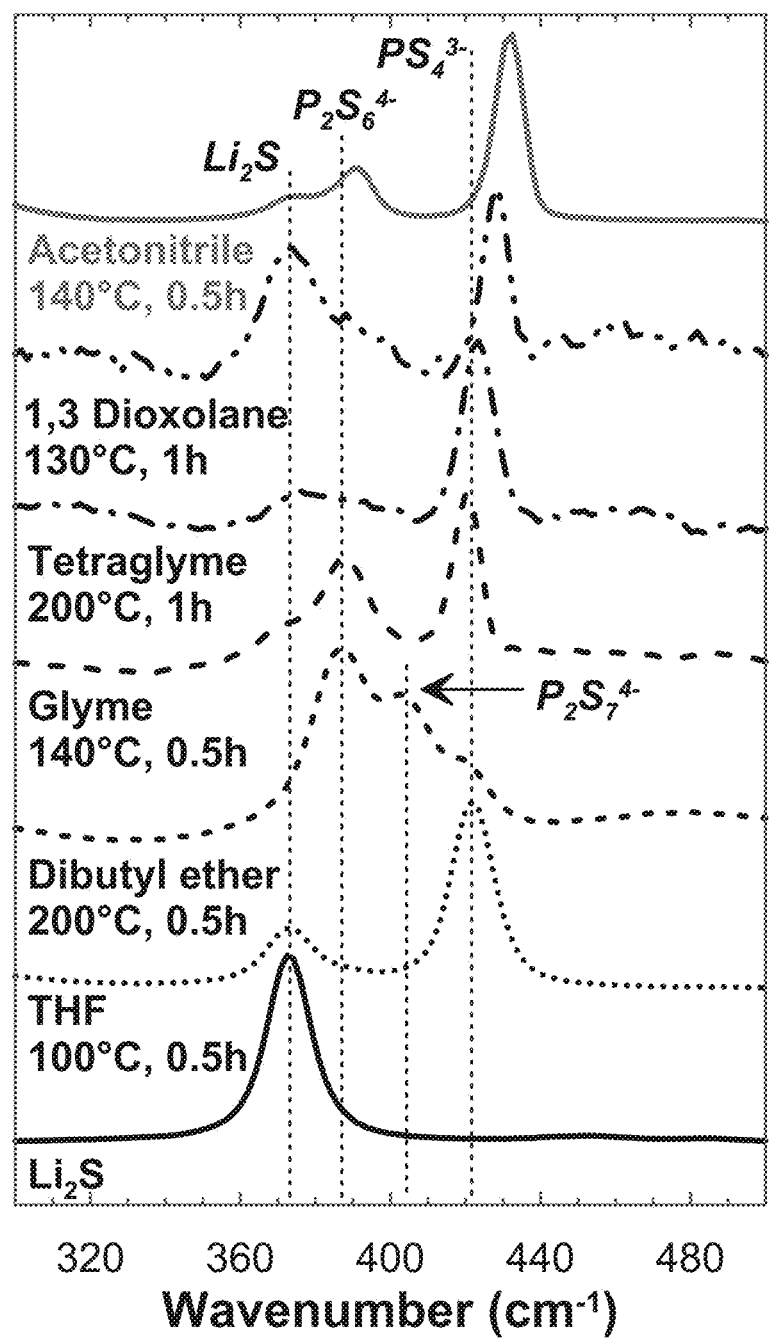
FIG. 1 shows Raman spectra of 3Li$_2$S:P$_2$S$_5$ samples microwaved in various solvents.

Throughout this description, the terms "electrochemical cell" and "battery" may be employed interchangeably unless the context of the description clearly distinguishes an electrochemical cell from a battery. Further the terms "solid-state electrolyte" and "solid-state ion conductor" may be employed interchangeably unless explicitly specified differently. The term "approximately" when associated with a numerical value conveys a range from −10% of the base value to +10% of the base value.

In general the inventors are conducting ongoing investigation of lithium thiophosphate composites of formula (I):

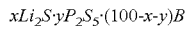

xLi$_2$S·yP$_2$S$_5$·(100-x-y)B wherein B is a composite material selected from the group of materials including Li$_3$N, P$_2$O$_5$ Li$_2$O, LiN$_3$, GeS$_2$ or LiX wherein X is I, Cl or Br, each of x and y represent a mass % value of from 33.3% to 50% such that the total mass % of Li$_2$S, P$_2$S$_5$ and B is 100%. Lithium thiophosphate compounds of interest also include Li$_3$PS$_4$, Li$_7$P$_3$S$_{11}$ and Li$_{10}$GeP$_2$S$_{11}$. As described in the background discussion of this disclosure known methods to prepare these lithium thiophosphate composites are lengthy, often do not yield high quality product and are not scaleable to industrial commercial batch size. Therefore, the inventors have undertaken a study of alternative methods of synthesis of these target compounds. In the course of this study, microwave synthesis was investigated.

Microwave irradiation has been successfully applied in the synthesis of both inorganic and organic materials. For example, Kawaji et al. (US 2016/0181657) describe the solid state synthesis of composite materials based on Li$_4$Sn$_3$O$_8$ doped with one or more off +2, +3, +4 and +5 metals. In comparison with conventional heating methods, reactions heated by microwaves may produce higher yields with milder reaction conditions and possibly shorter reaction times. Microwaves have a high-frequency electric field, which oscillates polar molecules and charged species, generating heat very quickly through friction. Additionally, heat is generated uniformly throughout the reaction vessel as opposed to flowing toward the reaction site via convection or conduction.

In the case of Li$^+$-conductive LTP solid electrolytes, the inventors considered that the Li$_2$S reactant is a salt comprised of Li$^+$ and S$^{2-}$ ions that can interact strongly with the electric field of the microwaves to produce heat locally. Moreover, because microwave reaction vessels are sealed, if a solvent is present, the solvent may be heated beyond its boiling point, which could potentially increase the solubility of reactants including Li$_2$S and P$_2$S$_5$ in the solvent.

The inventors have studied the synthesis of amorphous Li$_3$PS$_4$ (α-Li$_3$PS$_4$,) and of crystalline Li$_7$P$_3$S$_{11}$ as described in the examples. Unexpectedly, solid state synthesis methods such as described by Kawaji et al. did not achieve the target results. However, it was surprisingly discovered that when the microwave synthesis was conducted at significantly lower temperatures in polar organic solvents high yield of the target products could be obtained.

Conventionally, α-Li$_3$PS$_4$ is synthesized by mechanochemical milling a 3:1 molar ratio of Li$_2$S and P$_2$S$_5$ powders for 72 hours. The amorphous phase is desirable over the crystalline phases (β, γ) due to its enhanced conductivity. For example, at 25° C. α-Li$_3$PS$_4$ has a conductivity of about 0.1 mS/cm while crystalline β-Li$_3$PS$_4$ has a conductivity of about 0.001 mS/cm. Initially, a solid-state, microwave synthesis of Li$_3$PS$_4$ by directly reacting Li$_2$S and P$_2$S$_5$ powders in the absence of solvent was attempted (Example 1). The reaction was carried out at 290° C., to melt the P$_2$S$_5$, for 40 minutes. Raman spectroscopy (FIG. 1) indicated the presence of hypo-thiophosphate (P$_2$S$_6^{4-}$ anion) and ortho-thiophosphate (PS$_4^{3-}$ anion), but no PS$_4^{3-}$ anion. The presence of crystalline Li$_4$P$_2$S$_6$ and β-Li$_3$PS$_4$ was also confirmed by XRD.

Figure 2:
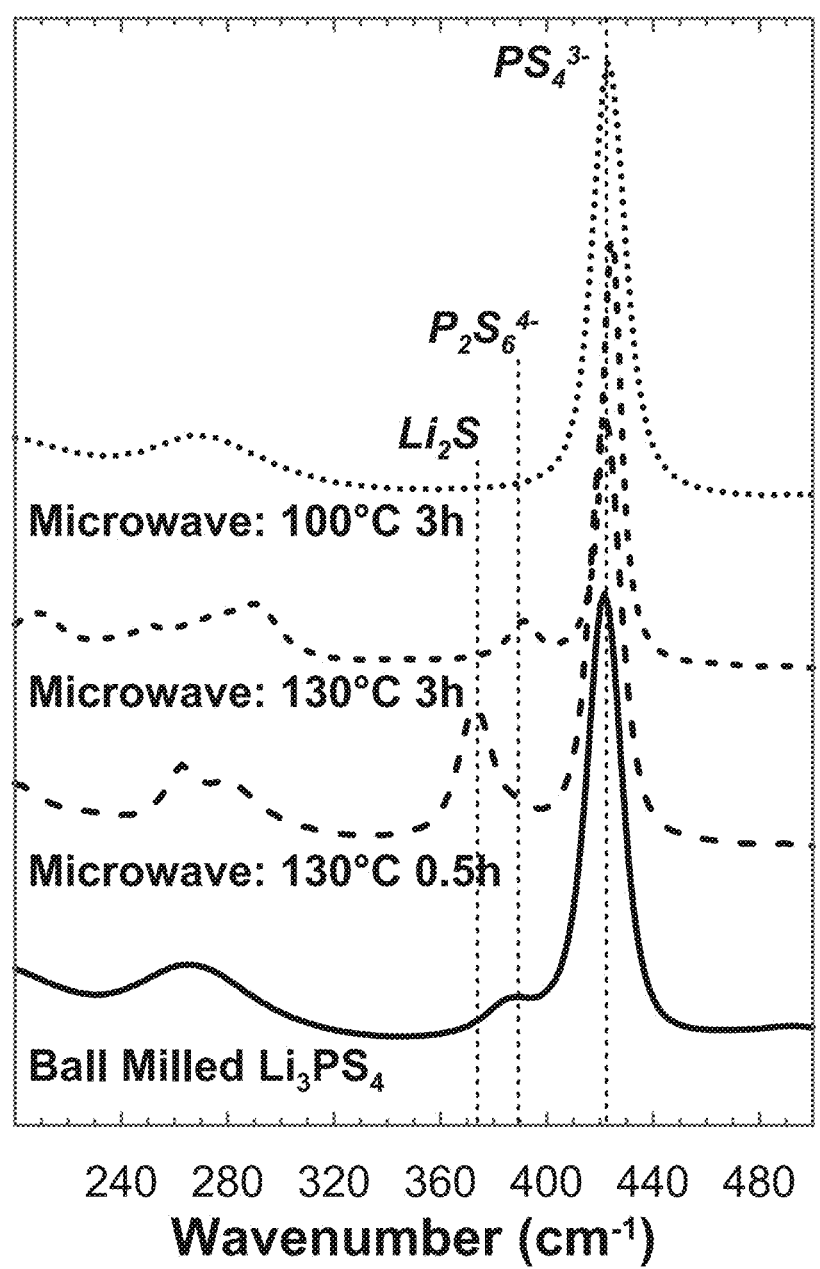
FIG. 2 shows Raman spectra of the insoluble product of a microwaved reaction of a 3:1 molar ratio of Li$_2$S to P$_2$S$_5$ in THF.
Figure 3:
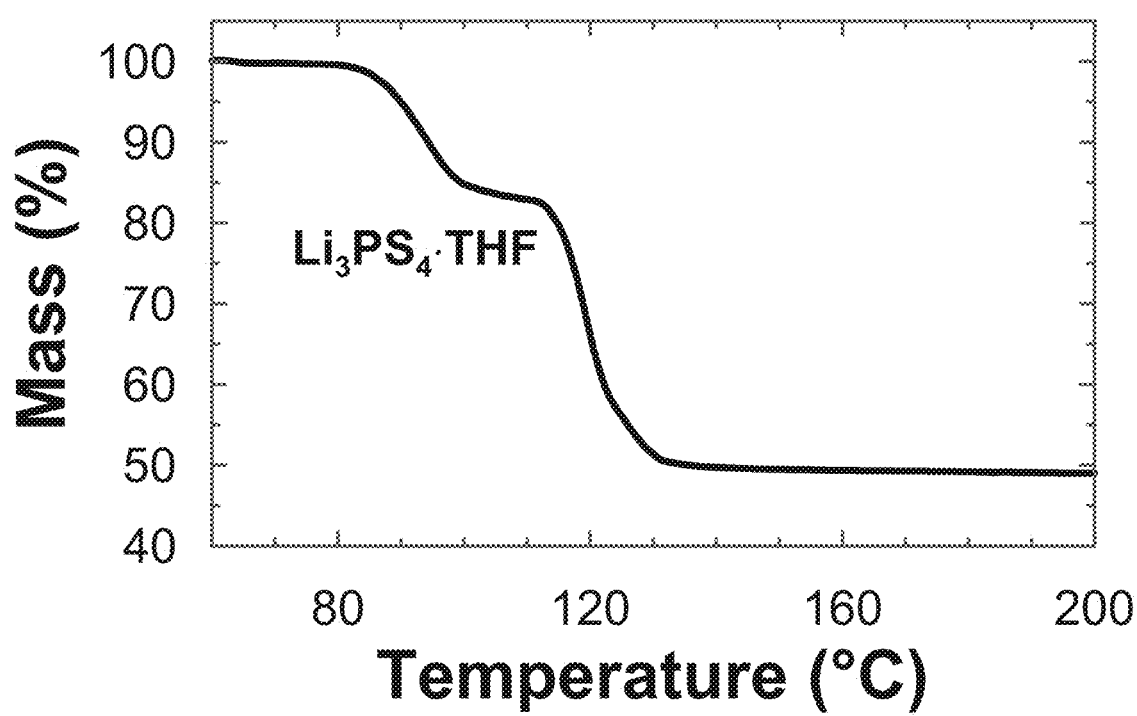
FIG. 3 shows a TGA curve of microwaved Li$_3$PS$_4$ synthesized in THF.

Investigation of the influence of solvents and significantly lower reaction temperatures in a solvothermal microwave induced reaction was then studied. Solvents in which Li$_2$S and P$_2$S$_5$ were at least partially soluble were selected. As indicated in FIG. 1 at reaction temperatures of from 100° C. to 200° C. in anhydrous polar solvents—including dibutyl ether, glyme, tetraglyme, 1,3-dioxolane, acetonitrile and tetrahydrofuran (THF)—Raman spectroscopy shows the presence of the desired PS$_4^{3-}$ anions in the product. Surprisingly, the PS$_4^{3-}$ anion was the sole product when the reaction was carried out in THF at 130° C. for 30 min, albeit as β-Li$_3$PS$_4$ with residual Li$_2$S as shown in FIG. 2. Extending the reaction time to 3 h eliminated the residual Li$_2$S but still produced β-Li$_3$PS$_4$ (FIG. 2). Thermal gravimetric analysis (TGA) showed that the THF molecules can be readily removed over a temperature range from 80° C. to 130° C., as shown in FIG. 3. The weight loss obtained from the TGA curve suggests a chemical composition of 2Li$_3$PS$_4$·5THF. After removing the solvent at approximately 130° C. (on a hot plate) for 3 hours, the powder was pressed into a pellet, compressed between two stainless steel rods and the Li$^+$ conductivity was measured using electrochemical impedance spectroscopy (EIS) at 25° C. The conductivity of this β-Li$_3$PS$_4$ was 0.0086 mS/cm, in agreement with previous results for β-Li$_3$PS$_4$ synthesized by ball milling.

The inventors believe that the solvent has a dramatic effect on the product composition, while the reaction temperature determines the phase crystallinity. To avoid crystalline Li$_3$PS$_4$, it is necessary to perform the microwave synthesis and coordinated solvent removal at temperatures below the amorphous to crystalline phase transition temperature of Li$_3$PS$_4$. Therefore, one must be cognizant of the temperature at which the coordinated solvent will be removed. If this temperature is too high, then the initially amorphous product will be detrimentally converted to a crystalline phase, such as β-Li$_3$PS$_4$.

Figure 4:
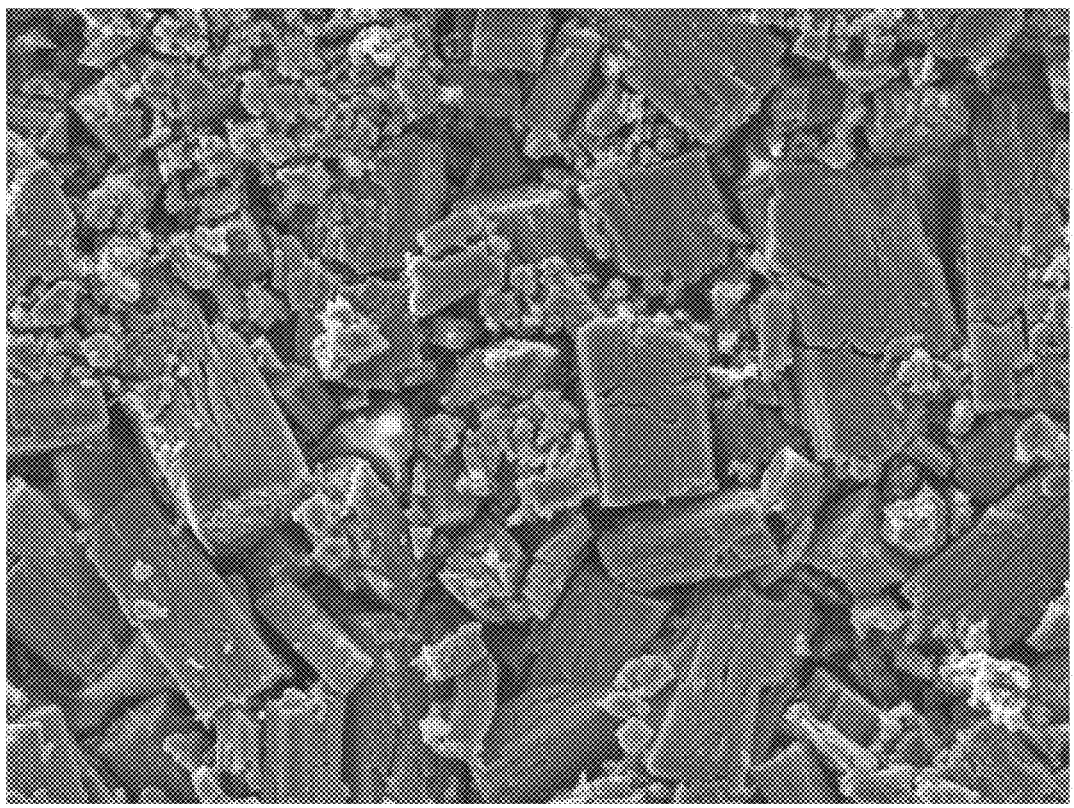
FIG. 4: SEM image of microwaved Li$_3$PS$_4$·nTHF.

Amorphous Li$_3$PS$_4$ was obtained h microwaving a 3:1 molar ratio of Li$_2$S and P$_2$S$_5$ in THF at 100° C. for 3 hours (FIG. 2). In contrast to the ball milled Li$_3$PS$_4$ sample, the microwaved sample is devoid of a P$_2$S$_6^{4-}$ anion impurity. The coordinated THF was removed at 130° C. under vacuum, resulting in a 50% weight loss. The resulting particles were either large and blocky or small as shown in FIG. 4. The inventors believe that further optimization of the reaction conditions could exert more control over particle size distribution and morphology.

Figure 6:
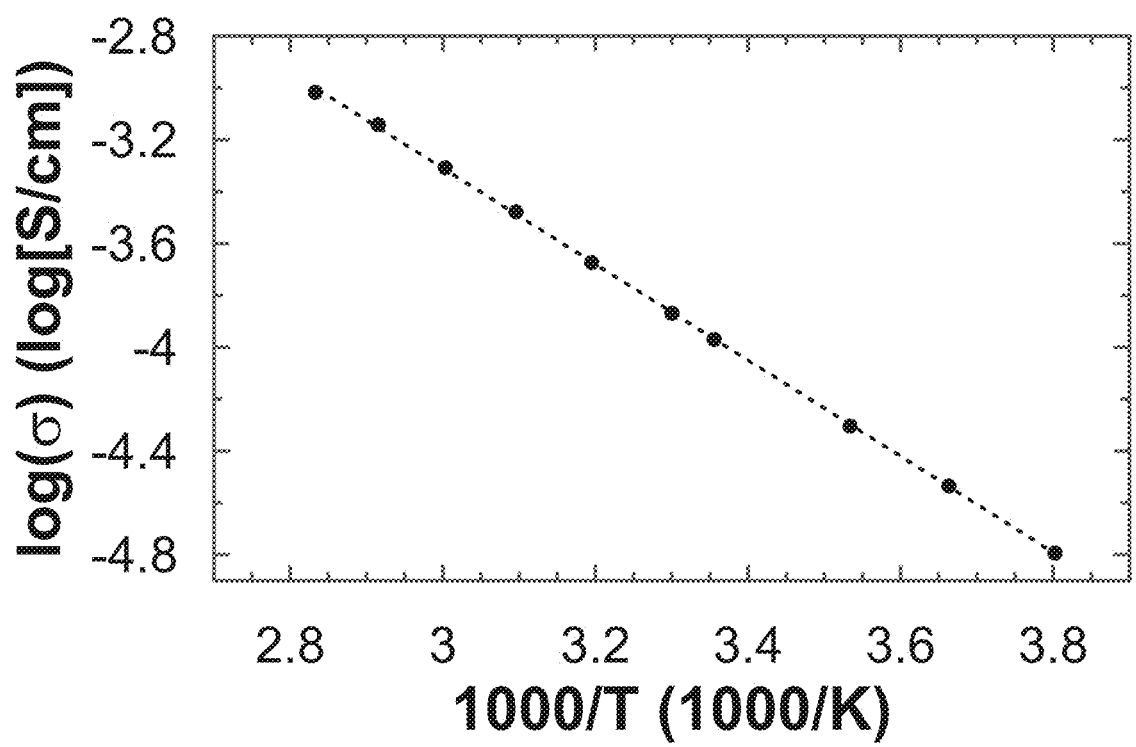
FIG. 6 shows an Arrhenius plot of the Li$^+$-conductivity of a-Li$_3$PS$_4$, measured using EIS.
Figure 7:
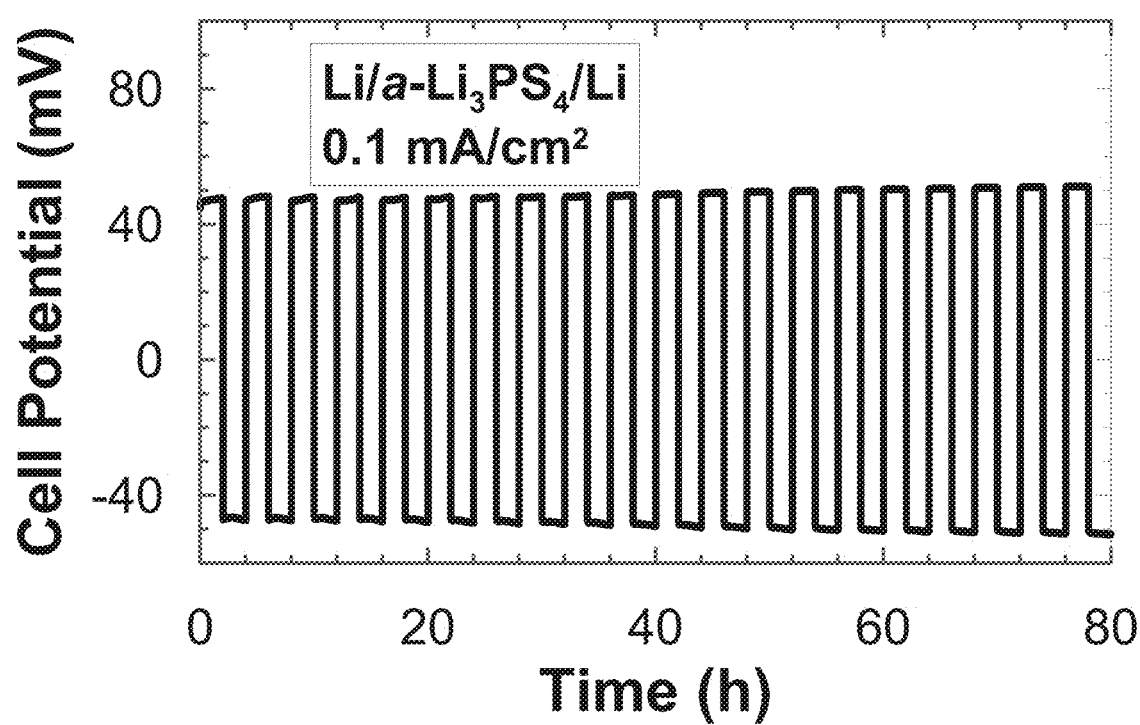
FIG. 7 shows the cycling behavior of a Li/a-Li$_3$PS$_4$/Li cell at 0.1 mA/cm$^2$ with 2 h half-cycles for 20 cycles at 25° C. using microwaved α-Li$_3$PS$_4$.

FIG. 6 displays an Arrhenius plot of the Li$^+$ conductivity of microwave-synthesized α-Li$_3$PS$_4$ between −10° C. and 80° C. measured using electrochemical impedance spectroscopy (EIS), yielding values of 0.1 mS/cm at 25° C. and 1 mS/cm at 80° C. The activation energy was calculated using the Arrhenius equation, $\sigma=\sigma_0 e^{-E_a/kT}$, to be 160 meV. FIG. 7 shows the voltage profile of a solid state Li/α-Li$_3$PS$_4$/Li cell as it was cycled at room temperature for 20 cycles to demonstrate the feasibility of microwave-synthesized LTP as a Li-ion electrolyte. During the initial cycles, the stripping and plating of Li occurred at an overpotential of 47 mV, at 0.1 mA/cm$^2$ for 2 h each half-cycle.

Crystalline Li$_7$P$_3$S$_{11}$ is comprised of PS$_4^{3-}$ and P$_2$S$_7^{4-}$ anions in a 1:1 ratio. Traditionally, crystalline Li$_7$P$_3$S$_{11}$ is synthesized in two steps: 1) Ball milling a 70 Li$_2$S:30 P$_2$S$_5$ molar ratio of powder for 3 days produces an amorphous phase of 7Li$_2$S-3P$_2$S$_5$ referred to as the pre-cursor. 2) Crystalline Li$_7$P$_3$S$_{11}$ is formed by heating the pre-cursor powder above the crystallization temperature (~260° C.). To demonstrate the broad applicability of the microwave solvothermal synthesis technique, the synthesis of crystalline Li$_7$P$_3$S$_{11}$ was attempted. Microwave, solid-state synthesis of crystalline Li$_7$P$_3$S$_{11}$ (300° C., 30 min) yielded a material (FIG. 8, solid line) containing P$_2$S$_6^{4-}$ (385 cm$^{-1}$) and PS$_4^{3-}$ (424 cm$^-$) anions but none of the desired P$_2$S$_7^{4-}$ (405 cm$^{-1}$). By using THF as a solvent and reducing the temperature to 75° C., the desired composition of 1 P$_2$S$_7^{4-}$:1 PS$_4^{3-}$ may be readily obtained by microwaving a 70:30 molar ratio of Li$_2$S and P$_2$S$_5$, for 2 hours. The TGA analysis, displayed in FIG. 9, indicates that the coordinated THF may be removed by heating the product to 150° C., resulting in a ~45% weight loss. This temperature is notably higher than in the case of a-2Li$_3$PS$_4$·5THF. The dried product powder can be annealed to form the crystalline form of Li$_7$P$_3$S$_{11}$.

Figure 10:
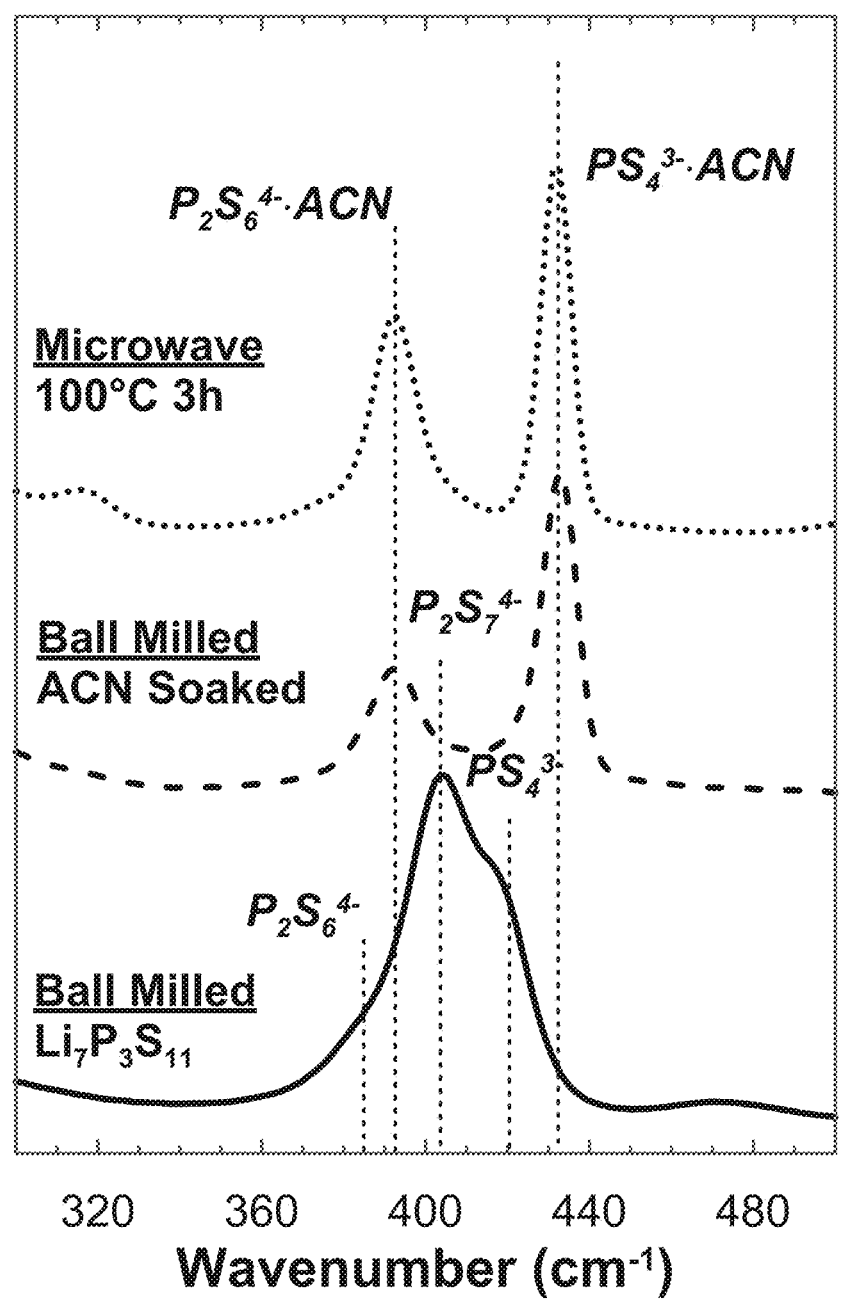
FIG. 10 shows Raman spectra of powders obtained from a reaction of a 7:3 molar ratio of Li$_2$S to P$_2$S$_5$.
Figure 11:
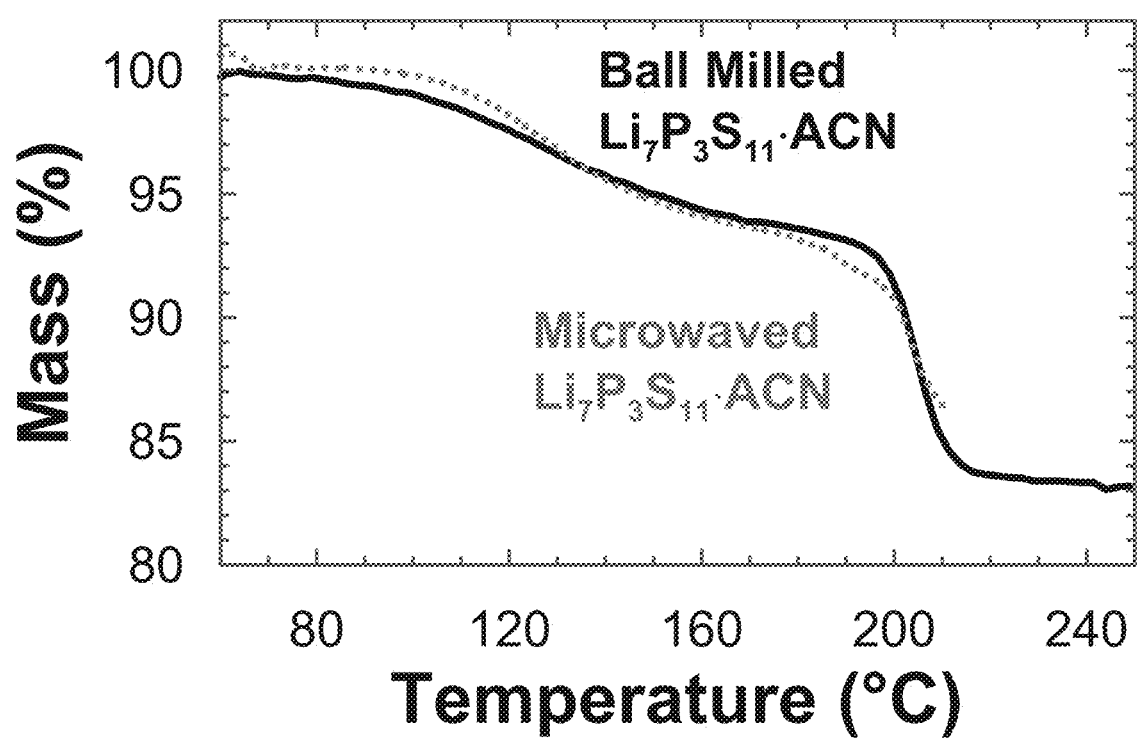
FIG. 11 shows the TGA curves of Li$_7$P$_3$S$_{11}$ pre-cursors coordinated with ACN.

As further example of the versatility of the microwave solvothermal method, Li$_7$P$_3$S$_{11}$ was synthesized in ACN, and the product compared with ball milled Li$_7$P$_3$S$_{11}$ that had been soaked in ACN overnight. FIG. 10 indicates that the Raman spectrum of the microwaved pre-cursor (dotted line) is similar to the soaked, ball milled Li$_7$P$_3$S$_{11}$ pre-cursor (dashed line). Although the Raman spectrum reveals both the P$_2$S$_6^{4-}$ and PS$_4^{3-}$ anions, Li$_7$P$_3$S$_{11}$ can be formed by heating these pre-cursors to initiate a solid-state reaction between the Li$_3$PS$_4$ and Li$_2$P$_2$S$_6$. FIG. 11 shows the TGA analysis for both microwaved (dotted, grey line) and soaked, ball-milled (solid line) pre-cursors, demonstrating that ACN can be removed by heating to approximately 200° C.

The inventors believe that the solvothermal microwave promoted synthesis method may have general utility for lithium thiophosphate composite materials and thus provide a synthesis production method suitable to produce the target product in quantities necessary for commercial scale manufacture in support of advanced energy generation d storage devices.

Thus, in the first embodiment, the present disclosure provides a method to prepare a target lithium thiophosphate composite, comprising:
preparing an anhydrous mixture comprising:
Li$_2$S;
P$_2$S$_5$;
optionally a component B; and
a nonaqueous polar solvent;
protecting the anhydrous mixture from air and humidity;
mixing the anhydrous mixture to at least partially dissolve the Li$_2$S, P$_2$S$_5$ and component B if present;
applying microwave energy to the protected anhydrous mixture to raise the reaction temperature to an optimum value for synthesis of the target lithium thiophosphate composite to obtain the target lithium thiophosphate composite; and
removing the polar solvent from the obtained lithium thiophosphate composite;
wherein a molar ratio of Li$_2$S to P$_2$S$_5$ and to B, if present, is determined by the composition of the target lithium thiophosphate composite.

The target composite lithium thiophosphate may be any composite material as may be prepared according to the stoichiometric charge or molar ratio of the Li$_2$S, P$_2$S$_5$ and B if included. As indicated by the examples described herein, once the target lithium thiophosphate composite is identified optimization of polar solvent, reaction temperature and reaction time along with other reaction variables may be achieved by routine experimentation based on the actual composite product obtained, the product yield and the product quality.

In selected aspects of the first embodiment, B may be included as a component and B may be one or a combination of components selected from Li$_3$N, P$_2$O$_5$ Li$_2$O, LiN$_3$, GeS$_2$ or LiX wherein X is I, Cl or Br. The disclosure is not necessarily limited to only this list of B components and one of skill in the art may select other components as a B unit in a lithium thiophosphate composite.

In one aspect of the first embodiment the target lithium thiophosphate composite is of formula (I):

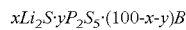

$$xLi_2S \cdot yP_2S_5 \cdot (100-x-y)B$$

wherein B is a composite material selected from the group of materials including Li$_3$N, P$_2$O$_5$ Li$_2$O, LiN$_3$, GeS$_2$ or LiX wherein X is I, Cl or Br, each of x and y represent a mass % value of from 33.3% to 50% such that the total mass % of Li$_2$S, P$_2$S$_5$ and B is 100%.

The nonaqueous polar solvent may be any of ethers, nitriles, alcohols, carbonates and esters, with the proviso that the polar solvent is volatile under reduced pressure at a temperature less than a phase transition temperature of the target lithium thiophosphate composite. Generally as described in the examples the target lithium thiophosphate composite may be obtained as a solid precipitate in the anhydrous polar solvent. The solid may be isolated from the mother liquor by any method known in the art, including decantation, filtration and centrifugation.

The solid material obtained from the isolation may contain coordinated solvent molecules which may be removed to obtain the solvent-free composite material. The coordinated solvent may be removed by any method known for such purpose and may require heating the material to an elevated temperature, preferably under reduced pressure, more preferably under vacuum. As previously described the temperature at which the solvent is removed must be at a value less than a phase transition temperature associated with the target lithium thiophosphate composite.

In one special embodiment of the present disclosure, the target lithium thiophosphate composite is amorphous $Li_3PS_4$ ($\alpha$-$Li_3PS_4$), a ratio of $Li_2S/P_2S_5$ is approximately 3/1, the solvent is tetrahydrofuran and no B component is present. As described in the examples the temperature of the microwave induced solvothermal reaction may be conducted at a temperature of approximately 100° C. or less for a reaction time of approximately 30 minutes to 3 hours. The product $\alpha$-$Li_3PS_4$ may be obtained by isolation from the mother liquor portion of the THF and then removal of the THF coordinated with the $\alpha$-$Li_3PS_4$.

In another special embodiment of the present disclosure, the target lithium thiophosphate composite is $Li_7P_3S_{11}$, a ratio of $Li_2S/P_2S_5$ is approximately 70/30, the solvent is THF or acetonitrile and no B component is present. As described in the examples the temperature of the microwave induced solvothermal reaction may be conducted at a temperature of approximately 75° C. or less for a reaction time of approximately 1 to 3 hours. The precursor product to $Li_7P_3S_{11}$ may be obtained by isolation from the mother liquor portion of the THF or acetonitrile and then removal of the coordinated solvent. $Li_7P_3S_{11}$ may then be obtained by annealing to form the crystalline $Li_7P_3S_{11}$.

In a more general embodiment of the present disclosure the target lithium thiophosphate composite is $xLi_2S \cdot yP_2S_5 \cdot$ (100-x-y)B, a ratio of $Li_2S/P_2S_5$ is approximately x/y, and a B component is present in an amount of 100-x-y. The anhydrous polar solvent, temperature of the microwave induced reaction and time of the reaction may be determined by routine experimentation. Generally the anhydrous polar solvent may be selected from ethers, nitriles, alcohols, carbonates and esters, with the proviso that the polar solvent is volatile under reduced pressure at a temperature less than a phase transition temperature of the target lithium thiophosphate composite. Generally, the time of the microwave induced reaction may be from 30 minutes to 5 hours, preferably from 30 minutes to 4 hours and most preferable from 30 minutes to 3 hours. Generally, the reaction temperature may be from 50° C. to 200° C., preferably 70° C. to 150° C. and most preferably from 75° C. to 130° C. The target lithium thiophosphate composite may be isolated from the mother liquor by methods previously described and freed of coordinated solvent as previously described.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

EXAMPLES

Example 1

Attempted Microwave Solid State Synthesis of a-$Li_3PS_4$

A solid-state, microwave synthesis of $Li_3PS_4$ by directly reacting $Li_2S$ and $P_2S_5$ powders in the absence of solvent was attempted. The reaction was carried out at 290° C., to melt the $P_2S_5$, for 40 minutes. Raman spectroscopy was employed to characterize the local structure of the product, which is shown in FIG. 1. The peaks at 385 $cm^{-1}$ and 422 $cm^{-1}$ are assigned to the hypo-thiophosphate ($P_2S_6^{4-}$ anion) and ortho-thiophosphate ($PS_4^{3-}$ anion), respectively. The presence of crystalline $Li_4P_2S_6$ and $\beta$-$Li_3PS_4$ was also confirmed by XRD. Specifically, the presence of the (221) peak but absence of the (211) peak confirms that the product is $\beta$-, and not $\gamma$-, $Li_3PS_4$.

Example 2

Attempted Microwave Solvothermal Synthesis of a-$Li_3PS_4$

To reduce the temperature of the reaction, we investigated solvents in which $Li_2S$ and $P_2S_5$ were partially soluble. In a wide variety of anhydrous polar solvents—including dibutyl ether, glyme, tetraglyme, 1,3-dioxolane, acetonitrile and THF—Raman spectroscopy once again reveals the presence of the desired $PS_4^{3-}$ anions in the product (FIG. 1), similar to the solvent-free reaction. In FIG. 1 the Raman spectra of $3Li_2S:P_2S_5$ samples microwaved in various solvents, including acetonitrile (top, $1^{st}$), 1,3 dioxolane ($2^{nd}$), tetraglyme ($3^{rd}$), glyme ($4^{th}$), dibutyl ether ($5^{th}$) and tetrahydrofuran (THF, $6^{th}$) are shown. The Raman spectrum of pure $Li_2S$ (solid, bottom) is also shown to demonstrate that some of the microwave syntheses did not react to completion in these cases. The $PS_4^{3-}$ anion was the sole product when the reaction was carried out in THF at 130° C. for 30 min, albeit as $\beta$-$Li_3PS_4$ with residual $Li_2S$ as shown in FIG. 2.

In FIG. 2 the Raman spectra of the insoluble product of a microwaved reaction of a 3:1 molar ratio of $Li_2S$ to $P_2S_5$ in THF is shown. The long-dashed line represents a reaction carried out at 130° C. for 30 min; the short-dashed line represents a reaction carried out at 130° C. for 3 h; the dotted line represents a reaction carried out at 100° C. for 3 h. The solid line is ball milled, amorphous $Li_3PS_4$ for comparison.

Extending the reaction time to 3 h eliminated the residual $Li_2S$ but still produced $\beta$-$Li_3PS_4$ (FIG. 2). Thermal gravimetric analysis (TGA) showed that the THF molecules can be readily removed over a temperature range from 80° C. to 130° C., as shown in FIG. 3. The weight loss obtained from the TGA curve suggested a chemical composition of $2Li_3PS_4 \cdot 5THF$. After removing the solvent at approximately 130° C. (on a hot plate) for 3 h, the powder was pressed into a pellet, compressed between two stainless steel rods and the $Li^+$ conductivity was measured using electrochemical impedance spectroscopy (EIS) at 25° C. The conductivity of this β-Li$_3$PS$_4$ was 0.0086 mS/cm, in agreement with previous results for β-Li$_3$PS$_4$ synthesized by ball milling.

Example 3

Synthesis of α-Li$_3$PS$_4$ (Amorphous Li$_3$PS$_4$)

Amorphous Li$_3$PS$_4$ was obtained by microwaving a 3:1 molar ratio of Li$_2$S and P$_2$S$_5$ in THF at 100° C. for 3 hours (FIG. 2). In contrast to the ball milled Li$_3$PS$_4$ sample, the microwaved sample was devoid of a P$_2$S$_6^{4-}$ anion impurity. The coordinated THF was removed at 130° C. under vacuum, resulting in a 50% weight loss. The resulting particles were either large and blocky or small as shown in FIG. 4. After the reaction, only a white powder remained at the bottom of the vial and the solution was colorless and clear.

Figure 5:
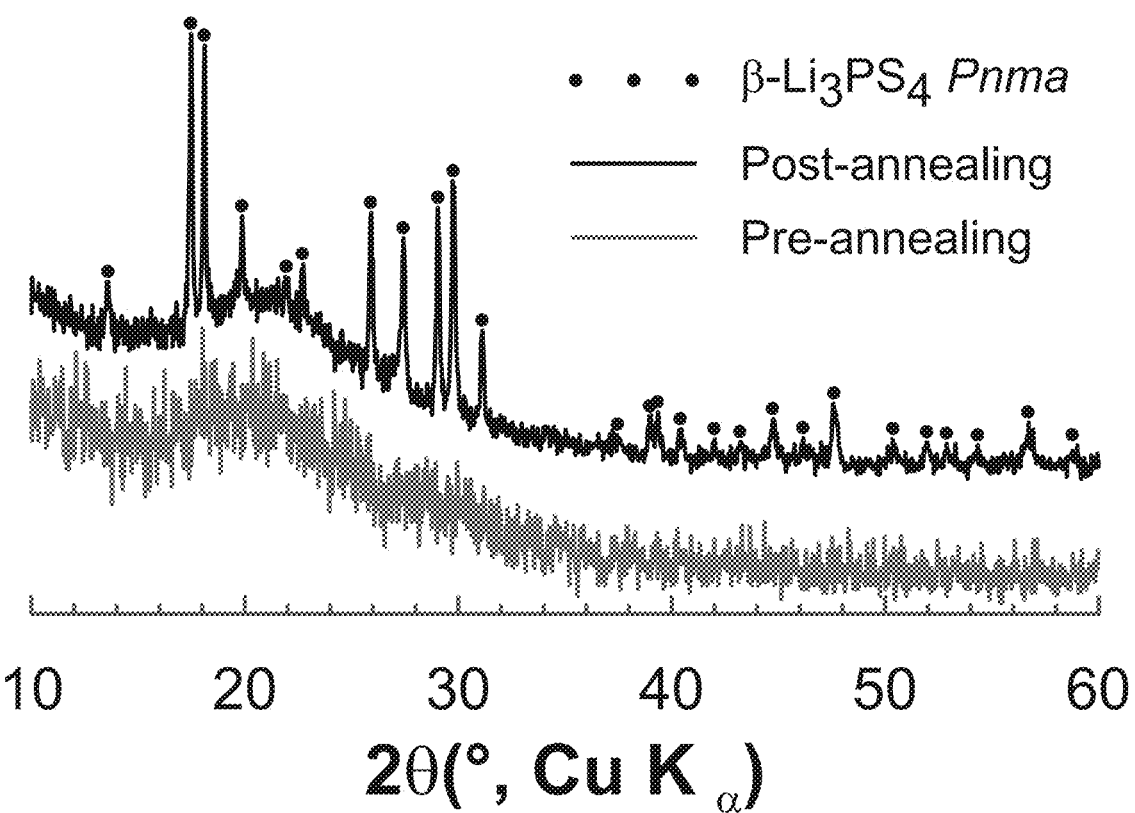
FIG. 5 shows XRD patterns of amorphous (a-, grey line) and crystalline (β-, black line) Li$_3$PS$_4$.

Annealing is the conversion of the amorphous product into a partially or completely crystalline form. Before annealing, the absence of any reflections (i.e. peaks) in the XRD pattern, shown in FIG. 5 (lowermost scan), inferred that the sample was amorphous. Confirmation of the Li$_3$PS$_4$ product was established by heating the powder at 150° C. for 1 hour to form β-Li$_3$PS$_4$, which can be positively identified by its fingerprint XRD pattern, as shown in FIG. 5 (uppermost scan). In FIG. 5 the broad hump centered at about 21° is from the quartz capillary.

FIG. 6 shows an Arrhenius plot of the Li$^+$ conductivity of microwave-synthesized a-Li$_3$PS$_4$ between −10° C. and 80° C. (measured using EIS), yielding values of 0.1 mS/cm at 25° C. and 1 mS/cm at 80° C. The activation energy was calculated using the Arrhenius equation, $\sigma=\sigma_0 e^{-E_a/kT}$, to be 160 meV. FIG. 7 shows the voltage profile of a solid state Li/α-Li$_3$PS$_4$/Li cell as it was cycled at room temperature at 0.1 mA/cm$^2$ with 2 h half-cycles for 20 cycles to demonstrate the feasibility of microwave-synthesized LIP as a Li-ion electrolyte. During the initial cycles, the stripping and plating of Li occurred at an overpotential of 47 mV, at 0.1 mA/cm$^2$ for 2 h each half-cycle.

Example 4

Attempted Microwave Solid State Synthesis of Li$_7$P$_3$S$_{11}$

Crystalline Li$_7$P$_3$S$_{11}$ is comprised of PS$_4^{3-}$ and P$_2$S$_7^{4-}$ anions in a 1:1 ratio.
Microwave, solid-state synthesis of a 70:30 molar ratio of Li$_2$S and P$_2$S$_5$ at 300° C. for 30 min yielded a material having the Raman spectra shown in FIG. 8 (solid line) containing P$_2$S$_6^{4-}$ as indicated by the Raman band at 385 cm$^{-1}$ and PS$_4^{3-}$ as indicated by the Raman band at 424 cm$^{-1}$ but none of the desired P$_2$S$_7^{4-}$ which is characterized by a Raman band at 405 cm$^{-1}$.

Example 6

Microwave Solvothermal Synthesis of Li$_7$P$_3$S$_{11}$ (THF)

Figure 8:
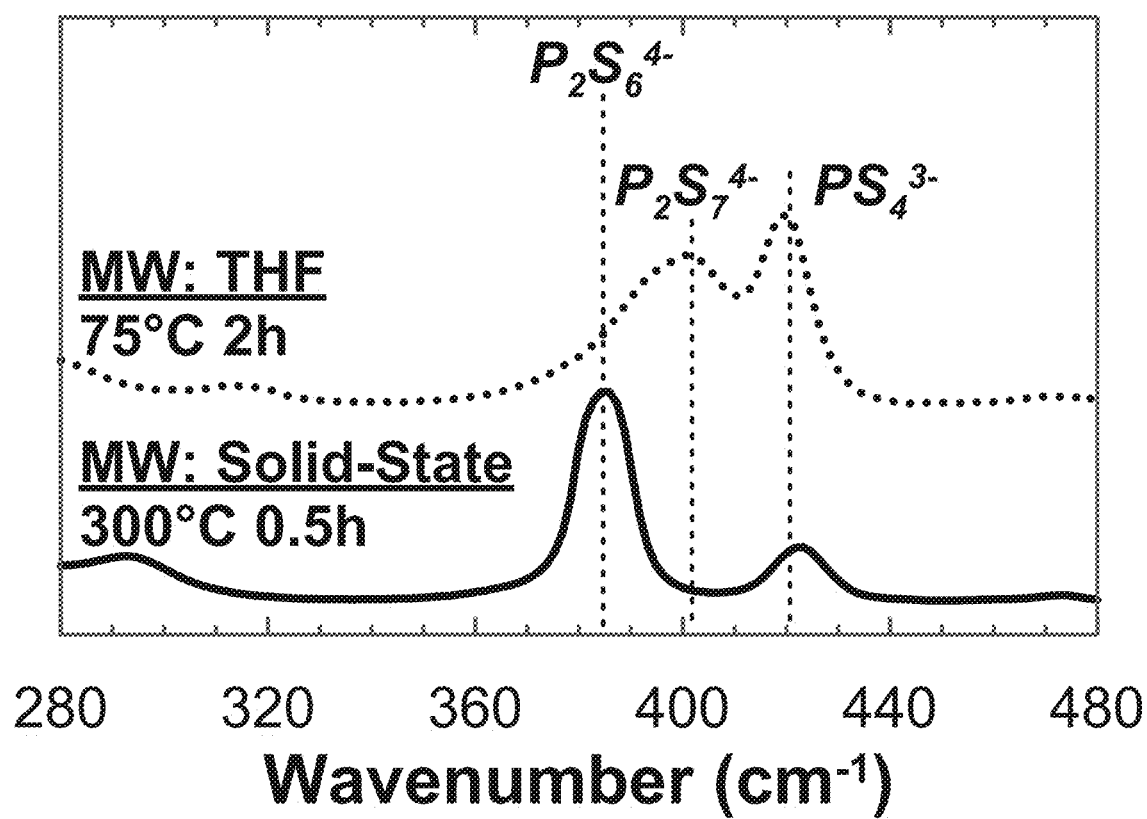
FIG. 8 shows a Raman spectra of powders obtained from a reaction of a 7:3 molar ratio of Li$_2$S to P$_2$S$_5$.
Figure 9:
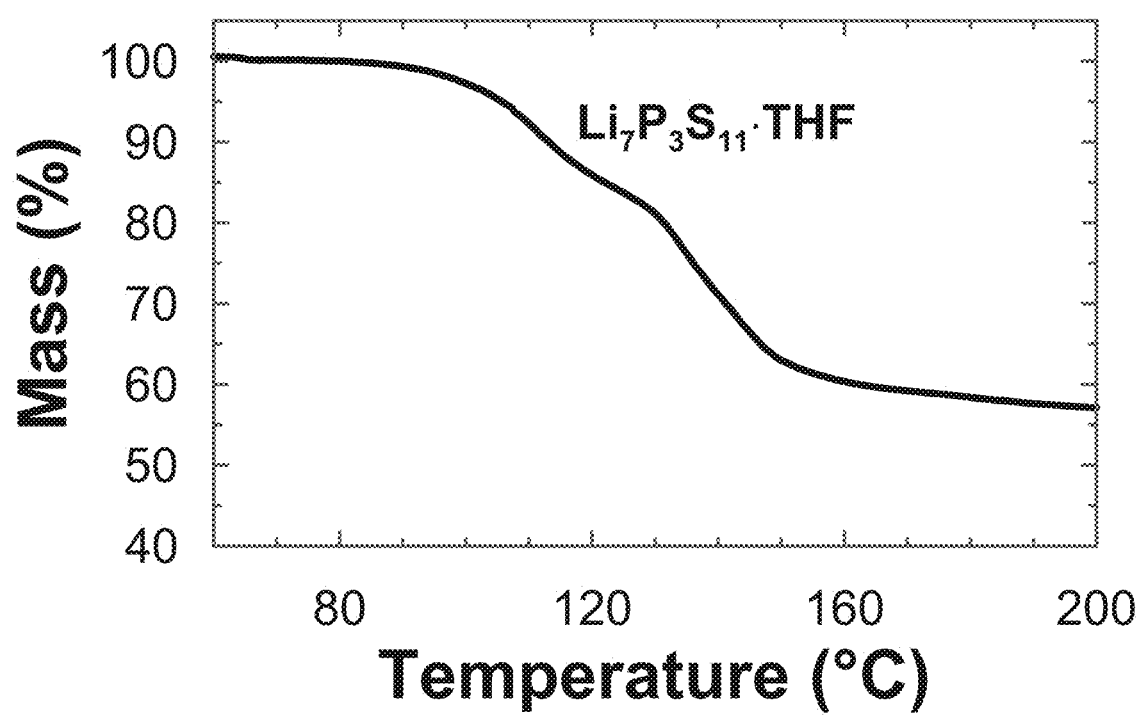
FIG. 9 shows a TGA curve of microwaved Li$_7$P$_3$S$_{11}$ pre-cursor synthesized in THF.

A 70:30 molar ratio of Li$_2$S and P$_2$S$_5$ was mixed in THF and microwave heated to 75° C. for 2 hours. As indicated in FIG. 8 (upper dotted curve) the desired composition of 1 P$_2$S$_7^{4-}$:1 PS$_4^{3-}$ was obtained. The TGA analysis, displayed in FIG. 9, indicates that the coordinated THF can be removed by heating the product to 150° C., resulting in a ~45% weight loss. The dried product powder was annealed to obtain the crystalline form of Li$_7$P$_3$S$_{11}$.

Example 7

Microwave Solvothermal Synthesis of Li$_7$P$_3$S$_{11}$ (ACN)

A 70:30 molar ratio of Li$_2$S and P$_2$S$_5$ was mixed in acetonitrile (ACN) and microwave heated to 100° C. for 3 hours. As indicated in FIG. 10 (upper dotted curve) the desired composition of 1 P$_2$S$_7^{4-}$: 1 PS$_4^{3-}$ was obtained. The TGA analysis, displayed in FIG. 11, indicates that the coordinated THF can be removed by heating the product to 150° C., resulting in a ~45% weight loss.

The solid line in FIG. 11 represents ball milled reaction of a 7:3 molar ratio of Li$_2$S to P$_2$S$_5$. The dashed line is the product of soaking ball milled, amorphous Li$_7$P$_3$S$_{11}$ in acetonitrile (ACN) for 24 hours, followed by acetonitrile removal. The dotted line represents the product of the microwave reaction in acetonitrile described above. "P$_2$S$_6^{4-}$·ACN" and "PS$_4^{3-}$·ACN" (dotted lines) show how ACN coordination increased the Raman excitation energy of those vibrations.

Example 8

Detailed Synthesis of Amorphous Li$_3$PS$_4$

Into a 10 mL silicon carbide microwave vial (Anton Paar), anhydrous THF (Manchester Organics, 3 mL) and a stir bar were added. To the vial, Li$_2$S (Aldrich, 99.98%, 41.4 mg, 0.900 mmol) and P$_2$S$_5$ (Sigma-Aldrich, 99%, 66.7 mg, 0.3 mmol) powder were added. The vial was immediately capped and vortexed. The vial was then transferred from the glove box to the microwave reactor. The mixture was heated to 100° C. for 3 hours with a stir rate of 1200 rpm. Due to the air sensitivity of the lithium thiophosphates, the IR temperature sensor was used to control the temperature. After the synthesis was complete, the vial was returned to the glove box and the white insoluble product was removed using suction filtration. After the solvent was removed, the residue was slurried in anhydrous heptane (10 mL) and the insoluble product was collected by suction filtration. The coordinated solvent (i.e. THF) was removed from the insoluble product by heating it to 124° C. on a hot plate in the glove box for 3 hours.

Example 8

Detailed Synthesis of Amorphous Li$_7$P$_3$S$_{11}$ Pre-Cursor

Into a 10 mL quartz microwave vial (Anton Paar), anhydrous acetonitrile (ACN) (Manchester Organics, 3 mL) and a stir bar were added. To the vial, Li$_2$S (Aldrich, 99.98%, 48.2 mg, 1.05 mmol and P$_2$S$_5$ (Sigma-Aldrich, 99%, 100 mg, 0.45 mmol) powder were added. The vial was immediately capped and vortexed. The vial was then transferred from the is glove box to the microwave reactor. The mixture was heated to 100° C. for 3 hours with a stir rate of 1200 rpm. Due to the air sensitivity of the lithium thiophosphates, the IR temperature sensor was used to control the temperature. After the synthesis was complete, the vial was returned to the glove box and the acetonitrile was removed at 50° C. under vacuum, leaving behind a white product. After the bulk solvent was removed, the coordinated solvent (i.e.

ACN) was removed from the powder product by heating it to 200° C. in a Buchi B-585 glass oven for 1 hour.

TGA Analysis.

TGA analysis was performed within an Ar glove box ($H_2O$, $O_2$<0.1 ppm) using a Netzsch Luxx STA 409 PC. About 8 mg of sample powder was loaded into a cold-sealable, DSC pan with a 75 μm diameter hole in the lid. The DSC pan was crimped, loaded into the Netzsch Luxx and heated at 2° C./min. The reference was an empty, crimped DSC pan with a hole in the lid.

Raman Analysis.

Raman spectroscopy was performed with a Horiba LabRAM HR spectrometer equipped with an inverted optical microscope. A 50x lwr objective lens was used to focus a 532 nm laser onto the powder sample, which was pressed against the inside surface of a sealed cuvette to protect it from air. The hack-scattered light was dispersed using a 600 grating/mm grating onto a CCD camera. Spectra were collected by performing 20 sequential scans, each with a 1 second duration. Spectra were collected from four different spots on each sample and compared to confirm sample homogeneity.

SEM Analysis.

SEM images were collected using a JEOL 7800 FLV at a magnification of 500× with an acceleration voltage of 5 kV and a beam current of 8 (43 pA).

Powder XRD Analysis.

A Rigaku SmartLab 3 kW fitted with an Anton-Paar HTK 1200N oven chamber and capillary extension was used to collect the XRD patterns. The 0.3 mm diameter quartz capillary was filled with dried, amorphous $Li_3PS_4$ and sealed with epoxy in the glove box before transferring it to the diffractometer. Patterns were collected with a 0.035° step size at a rate of 0.4167°/min. After the amorphous material was scanted, the capillary was heated to 150° C. to crystallize the material into β-$Li_3PS_4$. Multiple scans were performed so that the first and final patterns could be compared to confirm that the pattern did not change with time and, therefore, that the sample was successfully protected from air. The repeated scans were then added together to form the final XRD patterns.

Conductivity Measurement.

Into a Macor pellet die, 100 mg of $Li_3PS_4$ powder was added and then pressed at 66.4 bar for 1 min to form an 11.28 mm diameter pellet (i.e. 1.0 $cm^2$). Then, carbon-coated aluminum foil (MTI corp.) was pressed into both sides of the pellet. This stack of materials was compressed at about 88 MPa in an air-tight cell, attached to a Bio-logic VMP3 potentiostat, and placed into a temperature-controlled oven. Electrochemical impedance spectroscopy was used to measure the complex impedance of the cell at increasing temperatures from −10° C. to 80° C.

Electrochemical Cycling.

Into a Macor pellet die, 100 mg of $Li_3PS_4$ powder was added and then pressed at 66.4 bar for 1 min to form an 11.28 mm diameter pellet (i.e. 1.0 $cm^2$), 596 μm thick. Then, polished and flattened lithium foil discs (99.8%, Honjo Metal) were applied to both sides of the pellet, followed by 508 μm-thick 400 nickel spacers (McMaster-Carr) and 9.5 mm diameter wave springs (McMaster-Carr). The spring/spacer/Li/solid electrolyte/Li/spacer/spring stack was compressed to 8.8 MPa in a cell, transferred to a 25° C. oven and cycled in an air-tight container using a Bio-logic VMP3 potentiostat. The cell was cycled galvanostatically at 100 μA/$cm^2$ with 0.2 mAh/$cm^2$ half-cycles.

The invention claimed is:

1. A method to prepare a target lithium thiophosphate composite, comprising:
   preparing an anhydrous mixture comprising:
   $Li_2S$;
   $P_2S_5$;
   optionally a component B; and
   a nonaqueous polar solvent;
   mixing the anhydrous mixture to at least partially dissolve the $Li_2S$, $P_2S_5$ and component B if present;
   applying microwave energy to the anhydrous mixture to raise the reaction temperature to an optimum value for synthesis of the target lithium thiophosphate composite to obtain the target lithium thiophosphate composite; and
   removing the polar solvent from the obtained lithium thiophosphate composite;
   wherein a molar ratio of $Li_2S$ to $P_2S_5$ and to B, if present, is determined by the composition of the target lithium thiophosphate composite, and
   wherein the optional component B, when present is at least one compound selected from the group consisting of $Li_3N$, $Li_2O$, $LiN_3$, $GeS_2$ or LiX wherein X is I, Cl or Br.

2. The method to prepare a target lithium thiophosphate composite according to claim 1 wherein the nonaqueous polar solvent is selected from the group consisting of ethers, nitriles, alcohols, carbonates and esters, with the proviso that the polar solvent is volatile under reduced pressure at a temperature less than a phase transition temperature of the target lithium thiophosphate composite.

3. The method to prepare a target lithium thiophosphate composite according to claim 1 wherein the microwave energy applied the anhydrous mixture to induce reaction raises the temperature to a value of from 50° C. to 200° C.

4. The method to prepare a target lithium thiophosphate composite according to claim 1 wherein a time of the microwave induced reaction may be from 30 minutes to 5 hours.

5. The method to prepare a target lithium thiophosphate composite according to claim 1 wherein the target lithium thiophosphate composite is amorphous $Li_3PS_4$, a ratio of $Li_2S/P_2S_5$ is approximately 3/1, the solvent is tetrahydrofuran and no B component is present.

6. The method to prepare a target lithium thiophosphate composite according to claim 1 wherein the target lithium thiophosphate composite is $Li_7P_3S_{11}$, a ratio of $Li_2S/P_2S_5$ is approximately 70/30, the solvent is tetrahydrofuran or acetonitrile and no B component is present.

7. The method to prepare a target lithium thiophosphate composite according to claim 1 wherein the target lithium thiophosphate composite is $xLi_2S \cdot yP_2S_5 \cdot (100-x-y)B$, a ratio of $Li_2S/P_2S_5$ is approximately x/y, and a B component is present in an amount of 100-x-y.

* * * * *